(12) United States Patent
Reyniers (10) Patent No.: US 7,214,314 B2
(45) Date of Patent: May 8, 2007

(54) CLEANING APPARATUS AND METHOD

(76) Inventor: Lance A. Reyniers, 7754 N. Delta Pl., Milwaukee, WI (US) 53223

( * ) Notice: Subject to any disclaimer, the term of this patent is extended or adjusted under 35 U.S.C. 154(b) by 0 days.

(21) Appl. No.: 10/373,577

(22) Filed: Feb. 24, 2003

(65) Prior Publication Data

US 2004/0164033 A1    Aug. 26, 2004

(51) Int. Cl.
*A01K 63/04* (2006.01)
*E04H 4/16* (2006.01)

(52) U.S. Cl. .............. 210/232; 210/167.21; 210/238; 210/406; 210/416.1; 210/416.2; 210/443; 210/470; 210/299; 15/1.7

(58) Field of Classification Search ............... 210/169, 210/232, 237, 238, 406, 416.1, 416.2, 443, 210/460, 470
See application file for complete search history.

(56) References Cited

U.S. PATENT DOCUMENTS

| | | | | |
|---|---|---|---|---|
| 1,636,285 A | * | 7/1927 | Catron ................ 210/232 |
| 2,899,063 A | | 8/1959 | Ellis, Jr. |
| 2,956,507 A | | 10/1960 | Hutchinson |
| 3,289,847 A | * | 12/1966 | Rothemund ............ 210/266 |
| 3,458,441 A | * | 7/1969 | Dockery et al. ......... 210/416.2 |
| 3,774,613 A | * | 11/1973 | Woods et al. ............ 604/128 |
| 3,791,524 A | * | 2/1974 | Cho ..................... 210/232 |
| 3,935,106 A | * | 1/1976 | Lipner ................... 210/232 |
| 4,645,593 A | * | 2/1987 | Dunk et al. ............ 210/167.27 |
| 4,722,670 A | | 2/1988 | Zweifel |
| 4,870,975 A | * | 10/1989 | Cronk et al. ............ 600/562 |
| 4,915,828 A | | 4/1990 | Meyers et al. |
| 4,957,492 A | * | 9/1990 | McVay ................... 604/319 |
| RE34,031 E | * | 8/1992 | Thomsen et al. ......... 210/232 |
| 5,240,596 A | | 8/1993 | Chesnut |
| 5,269,913 A | * | 12/1993 | Atkins ................... 210/136 |
| 5,624,418 A | * | 4/1997 | Shepard ................. 604/319 |
| 5,634,229 A | * | 6/1997 | Stoltz ..................... 15/1.7 |
| 5,695,654 A | | 12/1997 | Schultz |
| 5,713,879 A | * | 2/1998 | Schneider ............... 604/319 |
| 5,792,126 A | * | 8/1998 | Tribastone et al. ........ 604/319 |
| D413,649 S | * | 9/1999 | King ...................... D23/209 |
| 5,975,022 A | | 11/1999 | Miller |
| 6,058,884 A | | 5/2000 | Rawls |
| 6,158,083 A | * | 12/2000 | Holsten .................. 15/326 |
| 6,202,677 B1 | | 3/2001 | Chen et al. |
| 6,269,773 B1 | | 8/2001 | Rawls |
| 6,328,066 B1 | | 12/2001 | Blake |
| 6,484,351 B2 | * | 11/2002 | Griffin et al. ............. 15/329 |

(Continued)

*Primary Examiner*—Robert James Popovics
(74) *Attorney, Agent, or Firm*—Michael Best & Friedrich LLP (57) ABSTRACT

A portable cleaning device for removing sediment from an enclosure retaining water. The cleaning device includes a pump, a housing, and a receptacle. The pump creates a fluid flow through the cleaning device. The cleaning device draws water from the enclosure into the housing through a tube. The housing includes an inlet passage and an outlet passage defined within the housing. The fluid flow path through the cleaning device is at least partially defined by the inlet passage, the receptacle and the outlet passage. The inlet passage receives the fluid flow from the tube and empties the fluid flow into the receptacle. The outlet passage receives fluid flow out of the receptacle. A filter is connected to the outlet passage and prevents relatively large particles in the water from entering the outlet passage. The fluid flow proceeds from the outlet passage toward the pump through an outlet tube.

15 Claims, 6 Drawing Sheets

U.S. PATENT DOCUMENTS

| | | | |
|---|---|---|---|
| 6,530,116 B2 * | 3/2003 | Berfield et al. | 15/328 |
| 6,626,877 B2 * | 9/2003 | Anderson et al. | 604/319 |
| 6,673,055 B2 * | 1/2004 | Bemis et al. | 604/319 |
| 7,115,115 B2 * | 10/2006 | Bemis et al. | 604/319 |
| 7,153,294 B1 * | 12/2006 | Farrow | 604/319 |
| 2002/0108205 A1 * | 8/2002 | Berfield et al. | 15/328 |
| 2003/0182755 A1 * | 10/2003 | Dicioccio | 15/321 |
| 2004/0164033 A1 * | 8/2004 | Reyniers | 210/800 |

* cited by examiner

CLEANING APPARATUS AND METHOD

FIELD OF THE INVENTION

This invention relates to an apparatus and method for collecting waste and cleaning water retained within an enclosure.

BACKGROUND OF THE INVENTION

Some enclosures retain water and are maintained for productive, recreational, decorative or aesthetic purposes. Some enclosures may require cleaning to remove sediment, waste or debris from the enclosure. Some cleaning devices use a vacuum source to draw the water through a filter to clean the water within the enclosure.

SUMMARY OF THE INVENTION

The present invention provides a cleaning device for removing particles, sediment, debris or waste from an enclosure retaining water. The cleaning device includes a housing and a receptacle removably connected to the housing. The housing includes an inlet passage and an outlet passage defined within the housing. The inlet passage receives the fluid flow from the enclosure and empties the fluid flow into the receptacle. The inlet passage includes an inlet aperture at the end of the inlet passage emptying into the receptacle. The outlet passage receives fluid flow out of the receptacle. The outlet passage includes an outlet aperture at an end of the outlet passage receiving fluid flow from the receptacle.

The receptacle includes a bottom surface at an end of the receptacle opposite the housing. In some constructions, the inlet aperture and outlet aperture are both disposed vertically above the bottom surface of the receptacle, and may be disposed completely vertically above the entire receptacle. Particles within the water may be gravitationally drawn downwardly within the receptacle toward the bottom surface.

In some constructions, the cleaning device may include a tube connected to the inlet passage. The tube extends outwardly from the inlet passage into the enclosure. The fluid from the enclosure may be drawn into the inlet passage through the tube.

In some constructions, the cleaning device may include a filter connected to the outlet passage that prevents relatively large particles in the water from entering the outlet passage. The filter may include several apertures that permit fluid to pass through the filter, but prevent particles from passing through the filter.

In some constructions, the cleaning device may include a pump that creates a fluid flow through the cleaning device. The fluid flow flows through the cleaning device along a flow path at least partially defined by the inlet passage, the receptacle and the outlet passage.

In some constructions, the cleaning may include an outlet tube connected to the housing and the pump. The outlet tube is in fluid communication with the outlet passage and the pump. The outlet tube may include a valve that controls fluid flow through the outlet tube and the cleaning device.

Independent features and independent advantages of the present invention will become apparent to those skilled in the art upon review of the following detailed description, claims and drawings.

Before any embodiments of the invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

Although references may be made below to directions, such as left, right, up, down, top, bottom, front, rear, back, etc., in describing the drawings, these references are made relative to the drawings (as normally viewed) for convenience. These directions are not intended to be taken literally or limit the present invention in any form.

DETAILED DESCRIPTION

Figure 1:
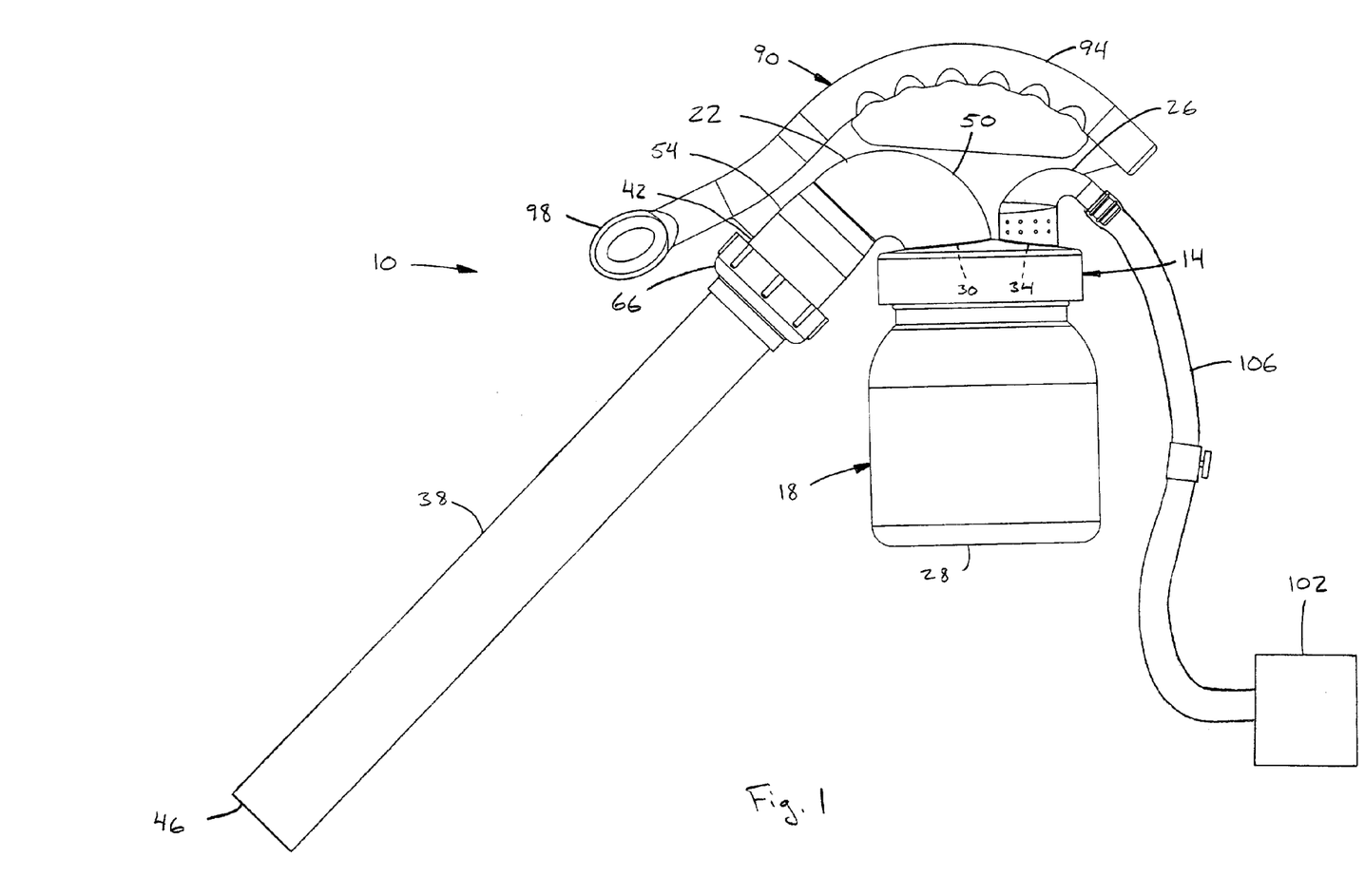
FIG. 1 is an elevation view of a cleaning device for cleaning an enclosure retaining water.
Figure 2:
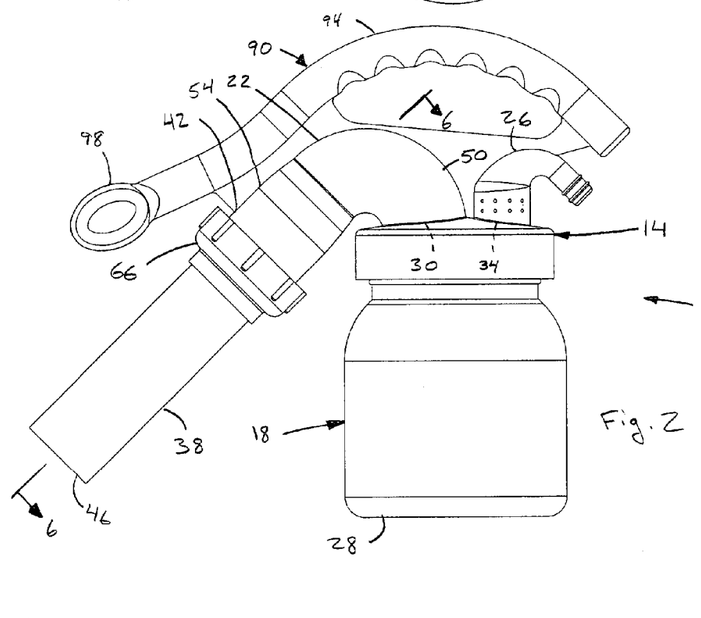
FIG. 2 is an elevation view of the cleaning device of FIG. 1.
Figure 3:
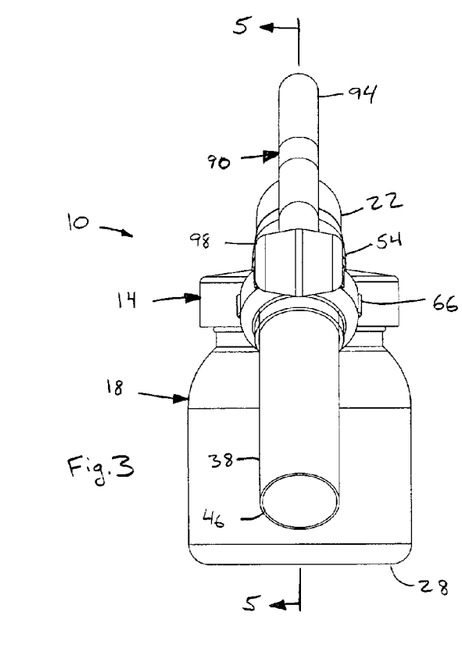
FIG. 3 is an elevation view of the cleaning device of FIG. 1.

FIG. 1 illustrates a cleaning device 10 for cleaning an enclosure retaining a fluid and removing particles from the fluid retained within the enclosure. The cleaning device 10 may also be used empty the enclosure and refill the enclosure. The enclosure may include a pond, aquarium, pool, spa, fountain or other similar structures that retain a fluid. Such enclosures generally retain water.

In the illustrated construction, the cleaning device 10 includes a housing 14 and a receptacle 18. The receptacle 18 may be removably connected to the housing 14. In the illustrated construction, the receptacle 18 and the housing 14 include threads, and the receptacle 18 threadedly engages the housing 14, similar to a jar and a lid, to create a seal between the receptacle 18 and the housing 14. The receptacle 18 generally includes an opening 20 near an upper portion, and the housing 14 is positioned over the opening 20 to enclose the volume within the receptacle 18. The cleaning device 10 may include an O-ring, gasket, or other similar sealing mechanism to improve the seal between the housing 14 and the receptacle 18. The cleaning device 10 generates a fluid flow through the cleaning device 10, and collects particles within the fluid flow in the receptacle 18.

The housing 14 defines an inlet passage 22 and an outlet passage 26. The receptacle 18 generally defines a volume, and the inlet passage 22 and outlet passage 26 are in fluid communication with the receptacle 18. The receptacle 18 includes a bottom surface 28 positioned near a lower portion of the receptacle 18 opposite the housing 14. The bottom surface 28 generally supports the contents of the receptacle 18. Particles collected within the receptacle 18 are generally gravitationally drawn downwardly and collect near the bottom surface 28.

Figure 5:
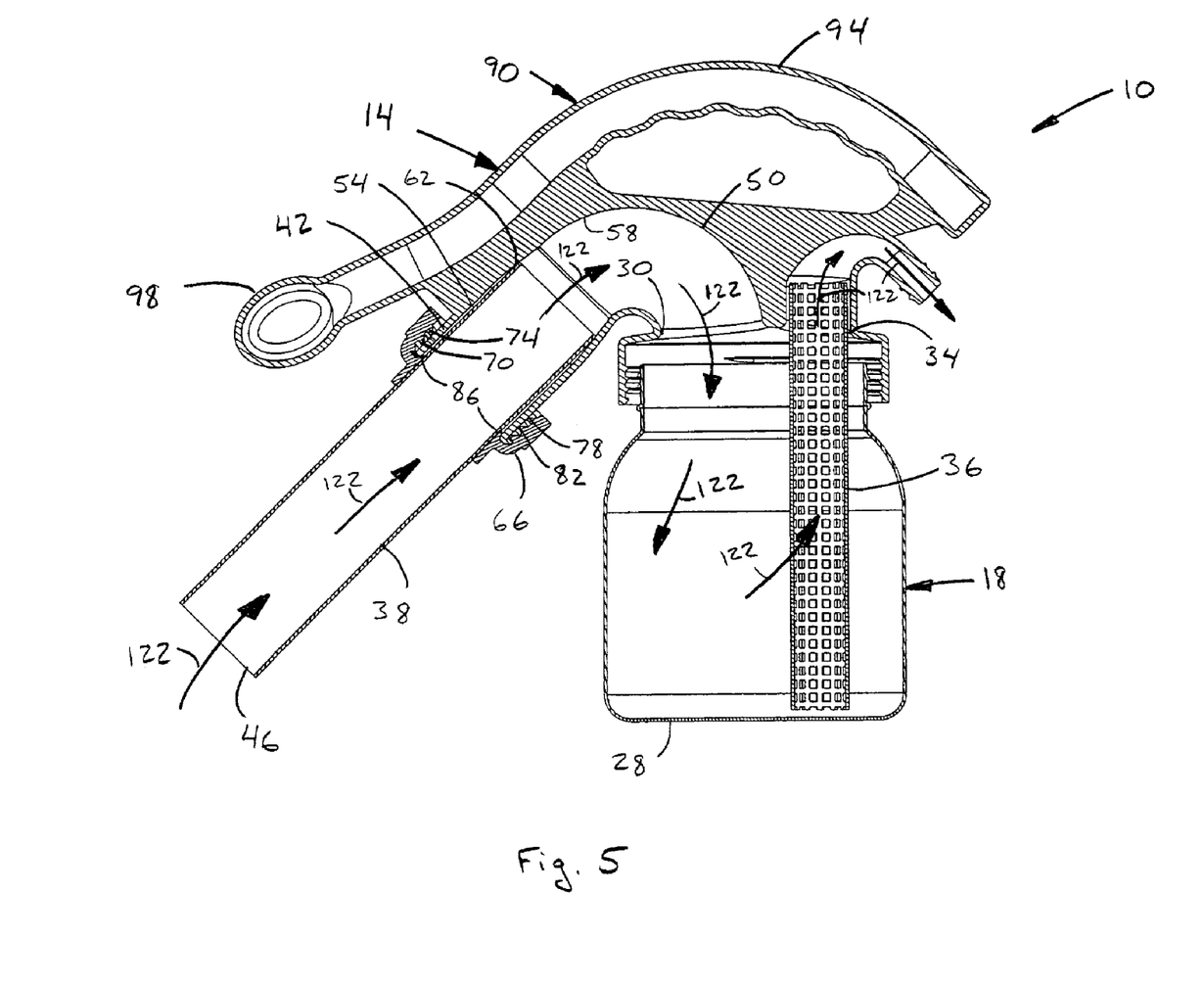
FIG. 5 is a cross-sectional view of the cleaning device taken along line 5—5 of FIG. 3.

The inlet passage 22 includes an inlet aperture 30 positioned at an end of the inlet passage 22 near the receptacle 18. The inlet passage 22 opens into the receptacle 18 through the inlet aperture 30 and empties fluid flow into the receptacle 18 through the inlet aperture 30. The outlet passage 26 includes an outlet aperture 34 positioned at an end of the outlet passage 26 near the receptacle 18. The outlet passage 26 opens into the receptacle 18 through the outlet aperture 34 and receives fluid flow from the receptacle 18 through the outlet aperture 34. The inlet aperture 30 and outlet aperture 34 are disposed vertically above the bottom surface 28 of the receptacle 18. As shown in FIG. 5, the inlet aperture 30 and outlet aperture 34 may be positioned completely above the receptacle 18. The inlet aperture 30 and outlet aperture 34 generally remain above the receptacle 18 while the cleaning device 10 is in the orientation of normal operation. Separating the inlet aperture 30 and outlet aperture 34 from the bottom surface 28 of the receptacle 18 helps prevent particles collected within the receptacle 18 from obstructing the inlet passage 22 or outlet passage 26.

Figure 4:
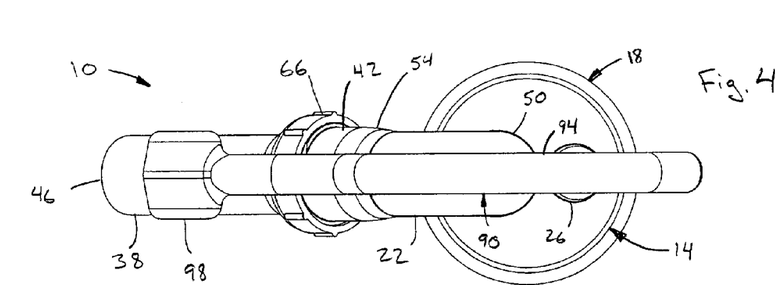
FIG. 4 is a plan view of the cleaning device of FIG. 1.

In the illustrated construction, the housing 14 may be solidly formed, and the inlet portion 22 and outlet portion 26 may be integrally formed within the housing 14. As shown in FIG. 4, the inlet passage 22 and outlet passage 26 are integrally formed passages within the housing 14, and define at least a portion of a flow path for fluid through the housing 14. In some constructions, the housing 14 may be solidly formed from a molded plastic material, cast from a metal material, or solidly formed by other similar means.

In the construction shown in FIG. 5, the cleaning device 10 includes a filter 36 connected to the outlet passage 26. In FIG. 5, the filter 36 includes a tube filter extending downwardly from the outlet passage 26 through the outlet aperture 34 and into the receptacle 18. The filter 36 restricts particles, sediment, debris or waste in the water from passing through the outlet aperture 34 into the outlet portion 26. The water flows through the filter 36 and into the outlet portion 26, and the particles, sediment, debris and waste remains in the receptacle 18. The filter 36 may include a mesh structure forming several apertures. The apertures may block particles that are larger than the apertures from entering the outlet passage 26.

As shown in FIGS. 1–6, the cleaning device 10 includes a tube 38 connected to the housing 14 near an outer end 42 of the inlet passage 22. The outer end 42 is at the end of the inlet passage 22 opposite the inlet aperture 30. The tube 38 is in fluid communication with the inlet passage 22. The tube 38 may be relatively rigid and includes an intake 46 at an end of the tube 38 opposite the housing 14. In the illustrated construction, the tube 38 extends outwardly from the housing 14 beyond the receptacle 18.

Figure 6:
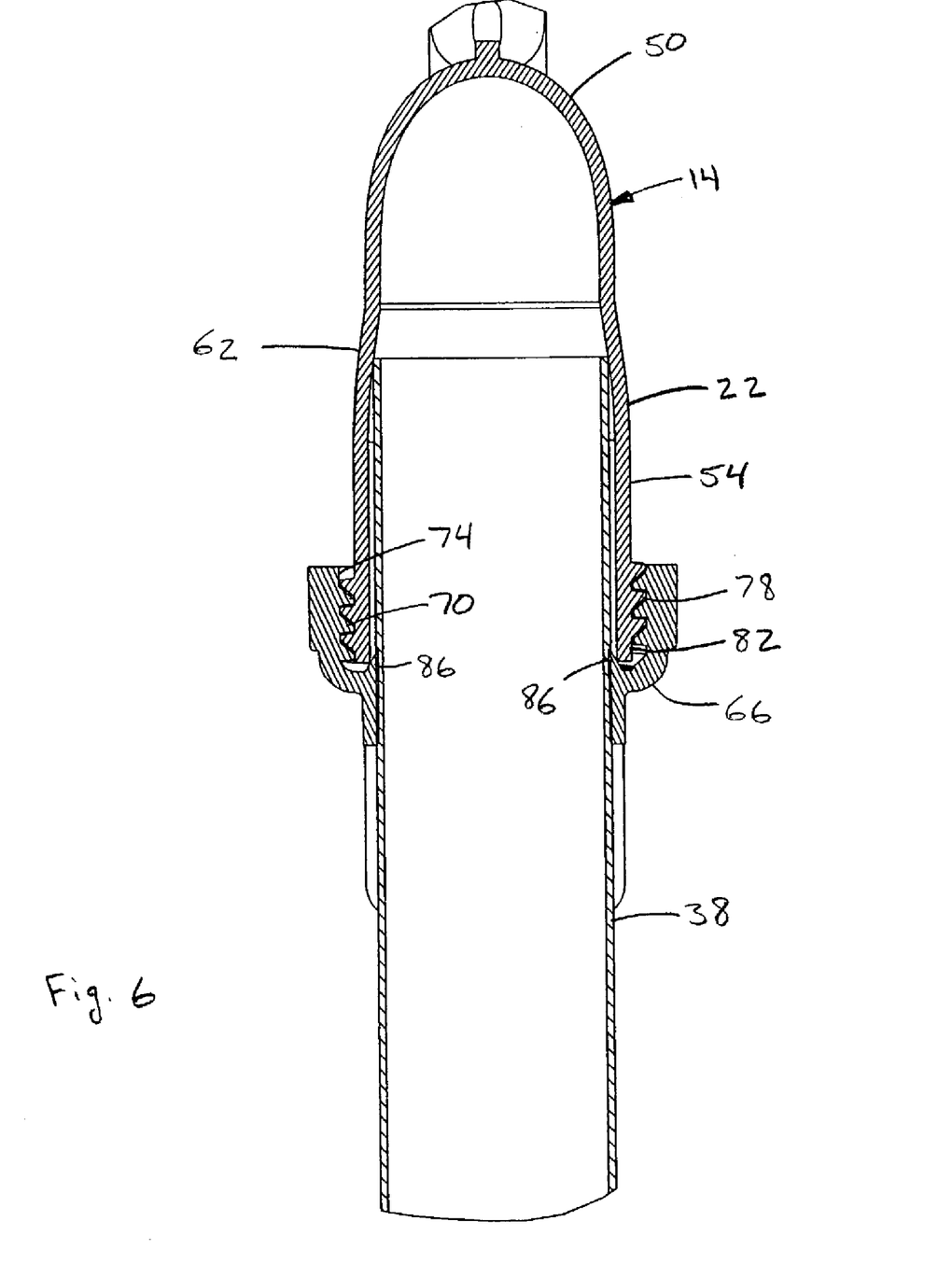
FIG. 6 is a partial cross-sectional view of the cleaning device taken along line 6—6 of FIG. 2.
Figure 7:
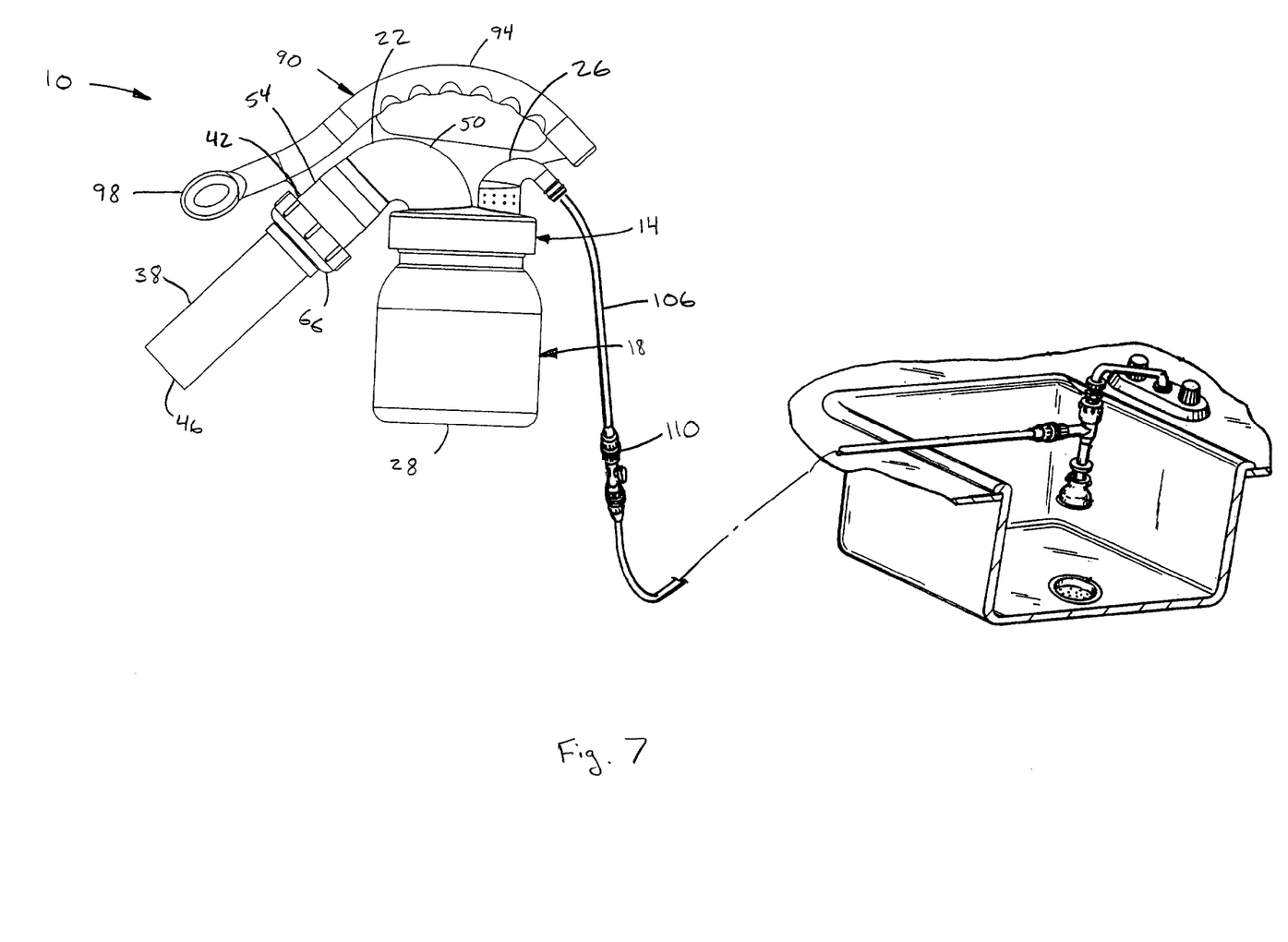
FIG. 7 is an elevation view of a cleaning device for cleaning an enclosure retaining water, the cleaning device having a faucet pump.

As shown in FIGS. 5 and 6, the tube 38 may extend into the inlet passage 22 of the housing 10. The inlet passage 22 may include a curved portion 50 and a straight portion 54. The curved portion 50 extends upwardly from the inlet aperture 30 and curves around to a mid-portion of the inlet passage 22. The straight portion 54 extends downwardly from the curved portion 50 to the outer end 42 of the inlet portion 22. In the illustrated construction, the straight portion 54 and the tube 38 are generally co-linear and extend at an angle relative to the receptacle 18. In the illustrated construction, the straight portion 54 has a generally cylindrical shape having a diameter.

The tube 38 extends into the straight portion 54 through the outer end 42. The inlet passage 22 includes an inner wall 58 that engages the tube 38. The inner wall 58 defines the straight portion 54 and the curved portion 50. In the illustrated construction, the straight portion 54 includes a slanted portion 62 in which the inner wall 58 slants inwardly. The diameter of the inlet passage 22 decreases along the slanted portion 62 as the inlet passage 22 progresses along the straight portion 54 toward the curved portion 50 and the inlet aperture 30. When the tube 38 is inserted into the inlet passage 22, the inner wall 58 along the slanted portion 62 provides an interference fit with the tube 38 and creates a seal between the tube 38 and the inlet passage 22.

In the illustrated construction, the tube 38 may include a collar 66 that connects the tube 38 to the housing 14. The collar 66 includes threads 70 on an inner surface 74 of the collar 66, and the housing 14 includes threads 78 on an outer surface 82 near the outer end 42 of the inlet passage 22. The collar 66 threadedly engages the housing 14 to create a seal between the tube 38 and the inlet portion 22. The collar 66 slides over the tube 38 and frictionally engages the tube 38.

As shown in FIGS. 5 and 6, the collar 66 may include a flange 86 adjacent the tube 38. As the inner surface 74 of the collar 66 is threaded onto the outer surface 82, the flange 86 extends into the inlet passage 22, between the inlet passage 22 and the tube 38. The flange 86 may be angled and may deflect radially inwardly and clamp the tube 38 to hold the tube 38 in place and improve the seal between the tube 38 and inlet passage 22.

The length of the tube 38 may vary depending on the desired application for the cleaning device 10. As shown in FIG. 1, the tube 38 extends downwardly beyond the receptacle 18. In some applications, such as cleaning a pond, an operator may hold the cleaning device 10 at approximately waist level, and the tube 38 extends into the water, which is relatively low in relation to the operator's feet. In some constructions for these applications, the tube 38 may extend between about three and six feet. It should be understood that the length of the tube 38 may vary and may be greater or less than that range. In some constructions for other applications, such as cleaning an aquarium, the tube 38 may be relatively shorter. The tube 38 may be removed and replaced with a tube 38 having the desired length.

In other constructions, the tube 38 may include telescoping portions (not shown) that may be positioned to adjust the tube 38 to a desired length. In yet other constructions, the tube 38 may be integrally formed with the housing 14.

As shown in FIGS. 1–5, the housing 14 may include a handle 90 to facilitate operation of the cleaning device 10. An operator may hold onto the handle 90 to maneuver the cleaning device 10 relative to the enclosure. The handle 90 may include a first gripping portion 94 and a second gripping portion 98. In FIGS. 1–5, the first gripping portion 94 is substantially D-shaped, and is positioned on the housing 14 vertically above the inlet passage 22 and outlet passage 26. The second gripping portion 94 is substantially T-shaped, and projects outwardly from the housing 14 forward of the first gripping portion 94 beyond the connection of the of the inlet passage 22 and tube 38. The two gripping portions 94, 98 of the handle 90 permit an operator to grip the cleaning device 10 with two hands and increase control of the cleaning device 10. In some constructions, the handle 90 may be integrally formed on the housing 14.

As shown in FIG. 1, the cleaning device 10 may include a pump 102 connected to the outlet passage 26. In the illustrated construction, an outlet tube 106 connects the outlet passage 26 and the pump 102 in fluid flow communication. The outlet tube 106 may include a valve 110 that selectively regulates fluid flow through the outlet tube 106.

The pump 102 creates a vacuum or negative pressure within the cleaning device 10 that generates a fluid flow through the cleaning device 10 that draws water from the enclosure into the cleaning device 10. The pump 102 may include a conventional pump, such as a cylinder pump, a rotary pump, a centrifugal pump, a screw pump, or other similar pumps that generate a fluid flow or create a pressure differential. As shown in FIGS. 7–11, the pump 102 may also include a faucet pump 114 having a venturi section 118. The faucet pump 114 may be connected to a faucet that provides a water flow. The faucet pump 114 directs the water flow from the faucet through the venturi section 118, which creates a vacuum or negative pressure within a portion of the faucet pump 114. The vacuum draws the fluid flow through the cleaning device 10.

Figure 8:
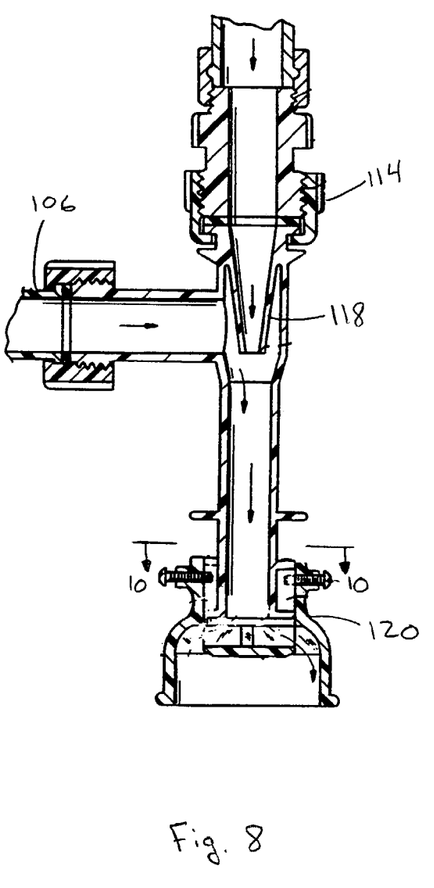
FIG. 8 is a cross-sectional view of the faucet pump of the cleaning device of FIG. 7 having a valve in an open condition.
Figure 9:
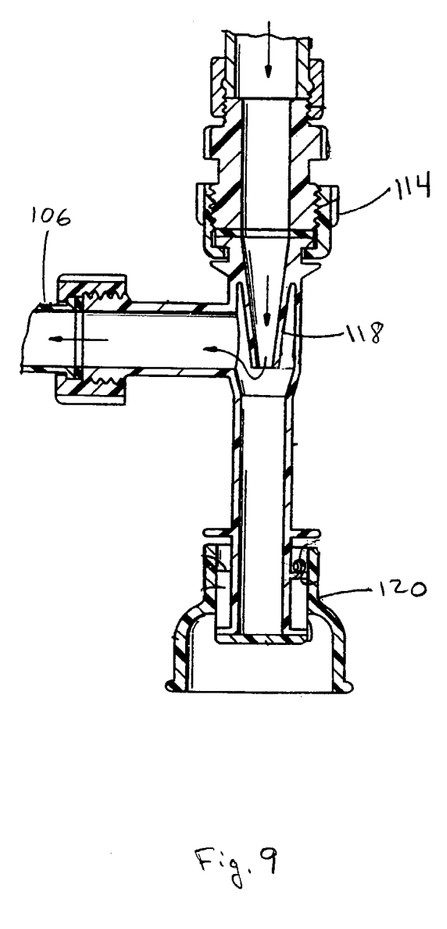
FIG. 9 is a cross-sectional view of the faucet pump of the cleaning device of FIG. 7 having a valve in a closed condition.
Figure 10:
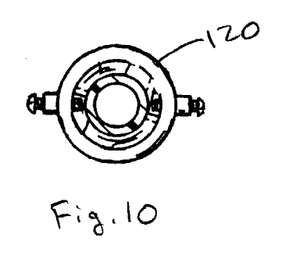
FIG. 10 is a cross-sectional view of the valve of the faucet pump taken along line 10—10 of FIG. 8.

The faucet pump 114 may also be used to reverse the fluid flow through the cleaning device 10 and refill an enclosure. The faucet pump 114 includes a valve 120 that directs fluid flow through the faucet pump 114. As shown in FIGS. 8–9 the valve 120 is disposed below the venturi section 118, and is movable between an open condition, in which water flows through the valve 120 and out of the faucet pump 114, and closed condition, in which the valve 120 restricts the water flow and the water flow is directed back through the outlet tube 106 toward the cleaning device 10. In FIG. 8, the valve 120 is open and the venturi section 118 of the faucet pump 114 is generating a fluid flow from the cleaning device 10. In FIG. 9, the valve 120 is closed, and water flow from the faucet is directed toward the cleaning device 10. FIG. 10 illustrates a cross-sectional view of the valve 120. Another example of a faucet pump is shown in U.S. Pat. No. 4,610,784, the entire contents of which are incorporated herein by reference.

In operation, the cleaning device 10 removes particles, sediment, debris, and waste from fluid flowing through the cleaning device 10. The pump 102 generates a fluid flow that draws fluid from an enclosure and flows through the cleaning device 10. The fluid flow through the cleaning device 10 flows along a flow path 122 through the cleaning device 10. In FIG. 5, arrows indicate the flow path 122 through the cleaning device 10. As shown in FIG. 5, the inlet passage 22 and outlet passage 26 define at least a portion of the flow path for fluid through the housing 14. The flow path 122 generally flows from the enclosure, into the intake 46, through the tube 38, through the inlet passage 22 and the inlet aperture 30, through the receptacle 18, through the outlet aperture 34 and outlet passage 26, and toward the pump 102. The pump 102 may discharge the fluid flow into a drain, into a second receptacle, back into the original enclosure, into a second enclosure, onto the ground, or various other places.

The cleaning device 10 draws fluid from the enclosure through the tube 38 and the fluid follows the flow path 122 into the inlet passage 22 of the housing 14. The inlet passage 22 empties the fluid into the receptacle 18 through the inlet aperture 30 near the top of the receptacle 18. In the receptacle 18, particles, sediment, debris, and waste within the fluid may be gravitationally drawn downward toward the bottom surface 28. The flow path 122 proceeds through the filter 36. The filter 36 may include multiple apertures sized to permit fluid to pass through the filter, but may prevent particles, sediment, debris, and waste that is larger than the apertures from entering the outlet passage 26. The particles that do not pass through the filter 36 are collected in the receptacle 18.

Figure 11:
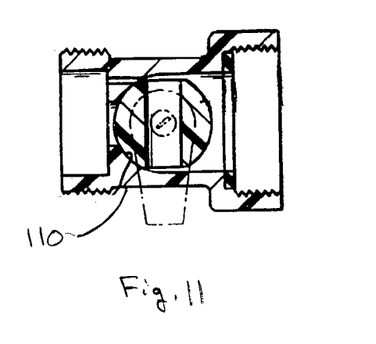
FIG. 11 is a cross-sectional view of a portion of the cleaning device of FIG. 7.

The outlet passage 26 then receives the fluid flow through the outlet aperture 34 near the top of the receptacle 18 and the flow path 122 reenters the housing 14. The inlet passage 22 and outlet passage 26 are both enclosed within the housing 14. From the outlet passage 26, the flow 122 path continues through the outlet tube 106 and into the pump 102. The valve 110 may control fluid flow through the outlet tube 106. FIG. 11 illustrates a cross-sectional view of the valve 110. When the valve 106 is open, fluid may flow through the outlet tube 106 and cleaning device 10. When the valve 106 is closed, fluid flow through the outlet tube 106 and cleaning device 10.

The foregoing detailed description describes only a few of the many forms that the present invention can take, and should therefore be taken as illustrative rather than limiting. It is only the claims, including all equivalents that are intended to define the scope of the invention.

I claim:

1. A portable cleaning device for removing sediment from an enclosure retaining water, the device comprising:
    a pump creating a fluid flow to draw water from the enclosure along a flow path through the cleaning device;
    a housing having an inlet passage, an outlet passage, and a threaded portion that are fixed with respect to one another, the inlet passage receiving the fluid flow from the enclosure, the outlet passage being connected to the pump;
    a receptacle removably connected to the threaded portion of the housing, the receptacle being in fluid communication with both the inlet passage and the outlet passage, the inlet passage emptying fluid flow into the receptacle, and the outlet passage for receiving fluid flow out of the receptacle, the flow path being at least partially defined by the inlet passage, the receptacle and the outlet passage;
    a filter connected to the outlet passage and preventing relatively large particles in the water from entering the outlet passage; and
    a tube threadably connected to the inlet passage and extending outwardly beyond the receptacle, the tube being in fluid communication with the inlet passage.

2. The device of claim 1, wherein the receptacle includes a bottom surface at an end of the receptacle opposite, the inlet passage having an inlet aperture at an end of the inlet passage emptying into the receptacle, the outlet passage having an outlet aperture at an end of the outlet passage receiving fluid flow out of the receptacle, the inlet aperture and the outlet aperture being spaced apart and both disposed vertically above the bottom surface.

3. The device of claim 1, wherein the inlet aperture and outlet aperture are both disposed vertically above the receptacle.

4. The device of claim 1, wherein the tube is relatively rigid.

5. The device of claim 1, further comprising an outlet tube connected to the outlet passage and the pump.

6. The device of claim 5, further comprising a valve connected to the outlet tube to selectively control fluid flow between the outlet passage and the pump.

7. The device of claim 1, further comprising a handle connected to the housing.

8. The device of claim 7, wherein the handle includes a first gripping portion positioned near the top of the housing, and a second gripping potion projecting outwardly from the housing forward of the first gripping portion.

9. The device of claim 7, wherein the handle is integrally formed with the housing.

10. The device of claim 1, wherein the receptacle threadedly engages the housing.

11. The device of claim 1, wherein the pump includes a faucet pump having a venturi section.

12. The device of claim 1, wherein particles in the water are gravitationally drawn downwardly within the receptacle and collect in the receptacle as the water flows through the receptacle.

13. The device of claim 1, wherein the inlet passage includes an inlet cross-sectional area, and the outlet passage includes an outlet cross-sectional area, the inlet cross-sectional area being greater than the outlet cross-sectional area.

14. The device of claim 1, wherein the inlet passage includes an inner wall, a substantially straight portion near the tube, and a curved portion near the inlet aperture, the inner wall having a generally cylindrical shape and a diameter extending along the straight portion, the inner wall having a slanted portion slanting radially inwardly to decrease the diameter as the straight portion progresses toward the curved portion and inlet aperture, the tube extending into the straight portion of the inlet passage and providing an interference fit with the slanted portion to form a seal between the tube and the housing.

15. The device of claim 1, wherein the tube includes a collar that threadably engages the housing near the inlet passage, the collar having a flange that extends into the inlet passage and deflects radially inwardly between the inlet passage and the tube as the collar is threaded onto the housing clamping the tube and forming a seal between the tube and the housing.

* * * * *